May 15, 1951        L. AKER        2,552,613
FRUIT-STEMMING MECHANISM
Filed June 29, 1945        5 Sheets-Sheet 1
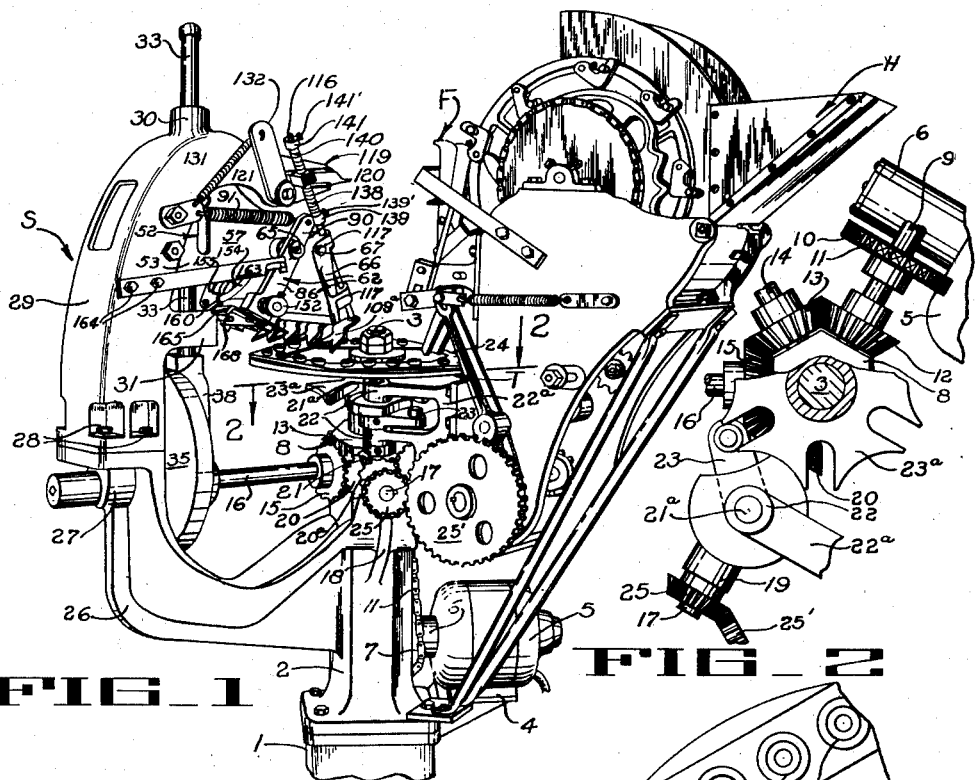
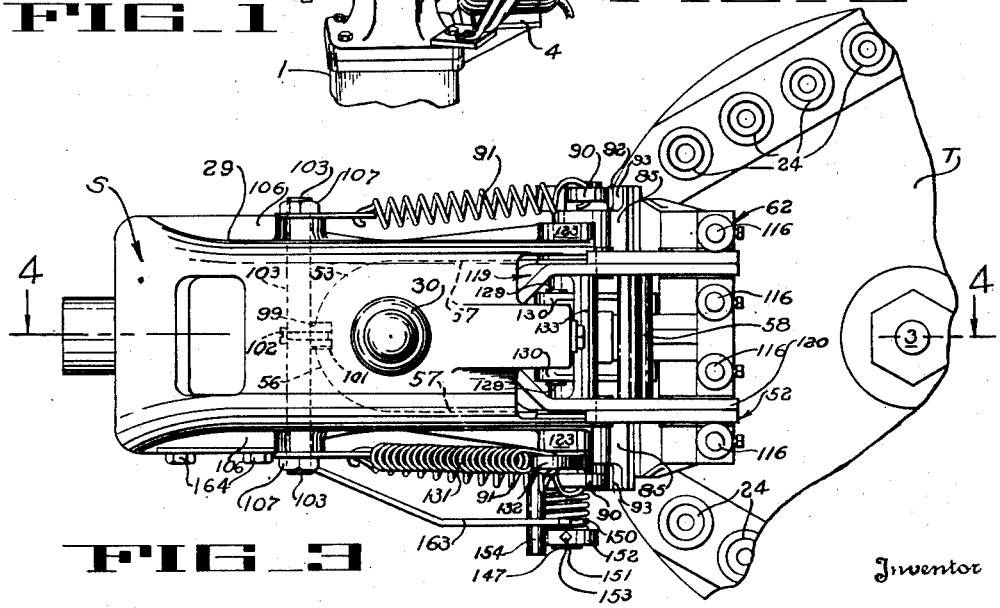
Inventor
LEONARD AKER.
By Philip G. Minnis
Attorney

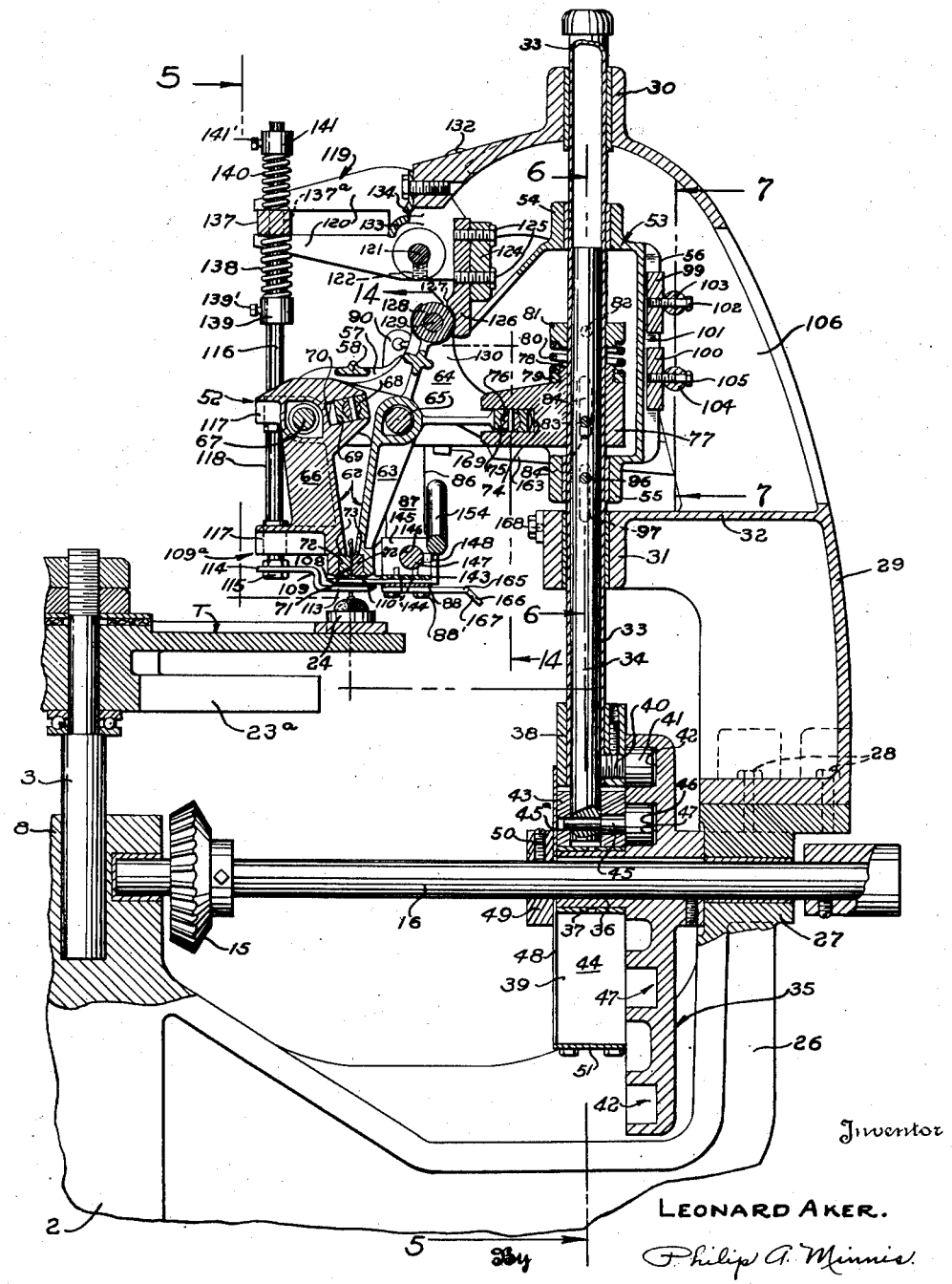

May 15, 1951  L. AKER  2,552,613
FRUIT-STEMMING MECHANISM
Filed June 29, 1945  5 Sheets-Sheet 3
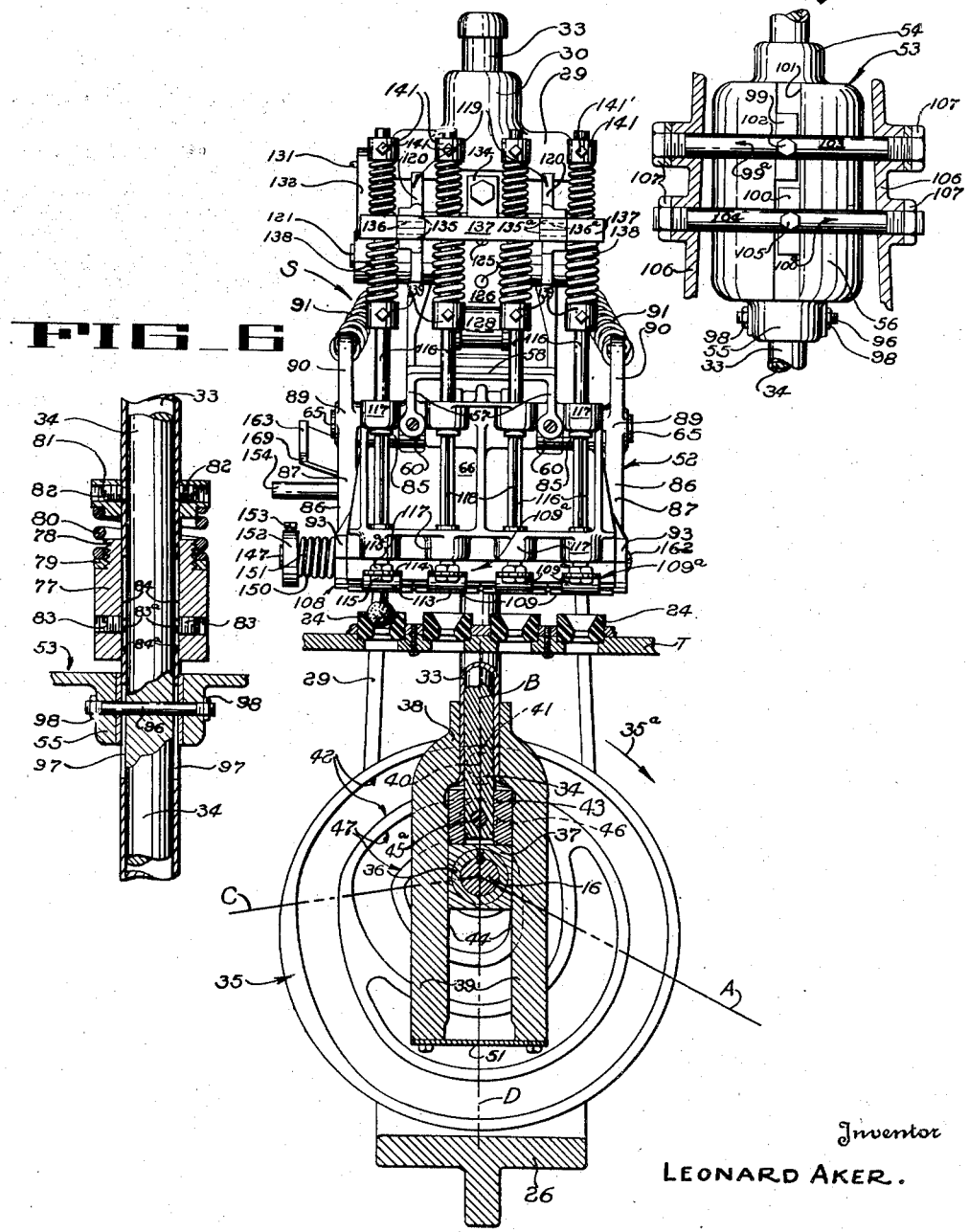
Inventor
LEONARD AKER.
By Philip G. Minnis
Attorney

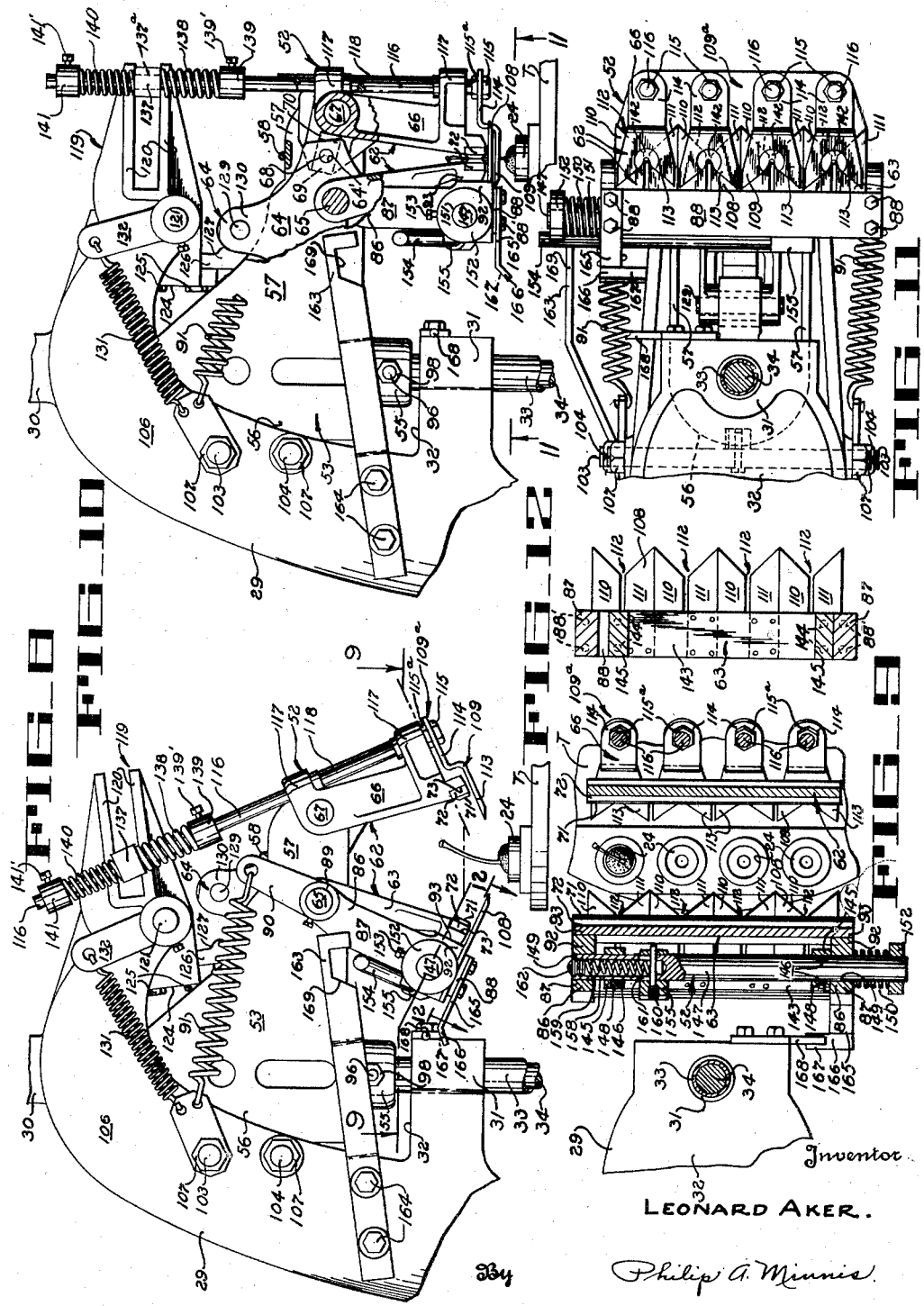

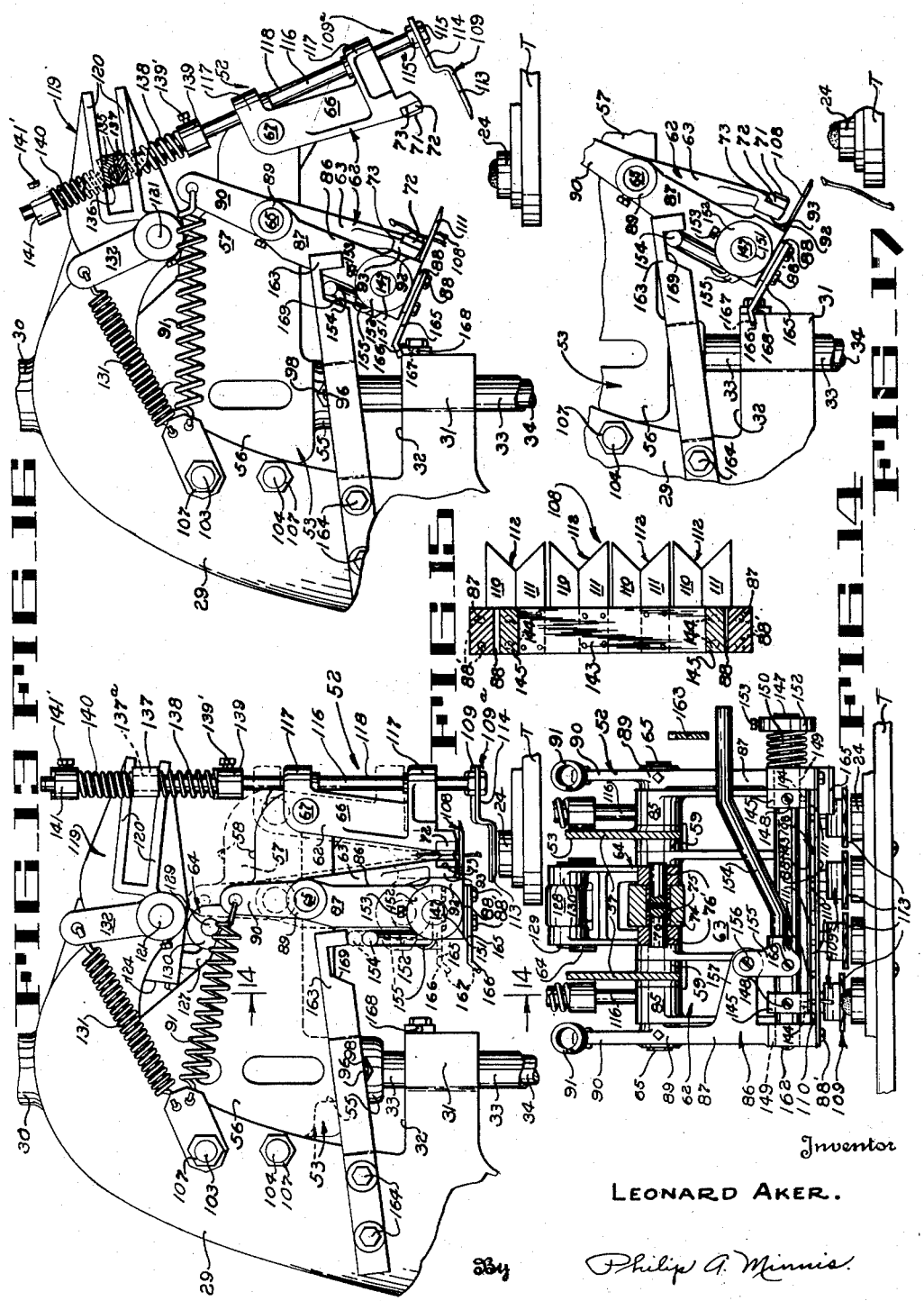

Patented May 15, 1951

2,552,613

UNITED STATES PATENT OFFICE 2,552,613

FRUIT-STEMMING MECHANISM

Leonard Aker, Palo Alto, Calif., assignor to Food Machinery and Chemical Corporation, San Jose, Calif., a corporation of Delaware Application June 29, 1945, Serial No. 602,324

21 Claims. (Cl. 146—55)

This invention relates to improvements in cherry handling machines and more particularly to stemming and orienting mechanism therefor.

One object of the present invention is to provide an improved cherry orienting and stemming mechanism of high efficiency and comparatively inexpensive construction.

Another object is to provide an improved mechanism for righting stem bearing cherries, for stemming the same and for depositing the stemmed cherries in righted position into the fruit holding cups of a cherry handling machine preparatory to pitting or reshaping operations upon the fruit.

Another object is to provide a cherry stemming mechanism with an improved stem discharge mechanism.

Another object is to provide a stemming mechanism for cherry pitting machines which includes a stem holding and discharge mechanism for discharging the stems severed from the fruit at a point exterior of the periphery of the fruit supporting turret of the pitting machine.

Other objects and advantages of the present invention will become apparent from the following description and drawings in which:

Fig. 1 is a perspective view of a cherry handling machine embodying the present invention.

Fig. 2 is a section of the drive mechanism of the machine taken along line 2—2 of Fig. 1.

Fig. 3 is an enlarged plan view of the stemming mechanism of the machine.

Fig. 4 is a vertical section of the stemming mechanism taken along line 4—4 of Fig. 3 with the parts thereof shown in stem gripping position.

Fig. 5 is an elevation of the stemming mechanism taken in the direction of line 5—5 of Fig. 4, certain parts of the machine being shown in section.

Fig. 6 is a vertical section of a portion of Fig. 4 taken along line 6—6 thereof.

Fig. 7 is a detail of the stemmer bracket taken along line 7—7 of Fig. 4.

Fig. 8 is a fragmentary side elevation of the stemming mechanism in initial or fruit receiving position.

Fig. 9 is a horizontal section taken along line 9—9 in Fig. 8.

Fig. 10 is a fragmentary side elevation of the stemming mechanism with the parts thereof in stem gripping position.

Fig. 11 is a bottom view taken along line 11—11 of Fig. 10.

Fig. 12 is a section taken along line 12—12 in Fig. 8.

Fig. 13 is a fragmentary side view of the stemming mechanism illustrating the parts thereof in fruit stemming position.

Fig. 14 is a section through the stemming mechanism taken along line 14—14 of Figs. 4 and 13.

Fig. 15 is a section similar to Fig. 12 but showing the stem clamping means in clamping position.

Fig. 16 is a fragmentary elevational view similar to Figs. 8, 10 and 13 but illustrating the removal of the stem to a point remote from the fruit support.

Fig. 17 is a fragmentary elevation of a portion of Fig. 16 illustrating the stem discharge position of the stemming mechanism.

The stemming and orienting mechanism of the present invention has been illustrated in connection with a cherry pitting machine of the type generally shown in U. S. Letters Patent No. 2,375,350, issued May 8, 1945, to Burton C. Coons, for Fruit Handling Machine. As best seen in Fig. 1 of the drawings, such machines comprise a supply hopper H, a feed mechanism F, a turret T and a stemming mechanism S as well as pitting and reshaping mechanisms which are not shown in the drawings.

In the operation of these machines, the cherries are deposited into the supply hopper H from which they are automatically fed by the feed mechanism F in righted position to the turret T. The turret T moves the cherries thus received into alignment with the stemming mechanism S which destems the cherries, orients the same incident to the stemming operation and returns the cherries in oriented position to the turret for further handling such as pitting, reshaping and ejecting by mechanism not shown herein.

The fruit handling machine as shown in Fig. 1 comprises a base 1 upon which a vertical standard 2 supporting a vertical shaft 3 is fixed. Rotatably mounted on the shaft 3 is the turret T previously referred to.

The base 1 is provided with a bracket 4 upon which a motor 5 having a speed reduction unit 6 and a drive sprocket 7 is mounted. The upper portion of the standard 2 is formed in a hexagonal body 8 supporting a shaft 9 provided with a sprocket wheel 10 keyed thereto. Trained around the sprocket wheels 7 and 10 is a drive chain 11 for driving the shaft 9 upon operation of the motor 5. Secured to the drive shaft 9 is a bevel gear 12 which intermeshes with a bevel gear 13 fixed to a shaft 14 rotatably mounted relative to the hexagonal body 8. The bevel gear 13 in turn meshes with a bevel gear 15 fixed to a stemmer drive shaft 16 for driving the stemming mechanism S.

Rotatably mounted between the hexagonal body 8 of the standard 2 and a boss 19 of a bracket 18 extending laterally and then vertically from the standard 2 (see Figs. 1 and 2) is a shaft 17. Fixed to this shaft 17 is a bevel gear 20 which intermeshes with the bevel gear 15 on the stemmer drive shaft 16. Another bevel gear 20a is keyed to the shaft 17 and meshes with a bevel gear 21 keyed to the bottom end of a shaft 21a supported in vertically aligned bearings 22 formed in a bracket 22a extending upwardly from the standard 2. Secured to the top end of shaft 21a is a driver 23 of a Geneva drive. The Geneva drive includes a star wheel 23a which is secured to the under side of the turret T as seen in Fig. 4 to intermittently rotate the turret T upon its shaft 3 and to index the turret relative to and in timed relation with the stemming mechanism S.

The turret T carries a plurality of fruit holding cups 24 arranged in groups, in the present instance in groups of four cups each aligned on chord lines of the turret as best seen in Fig. 3 so that upon intermittent operation of the turret T the groups of cups 24 are successively presented to the respective fruit treating units of the fruit handling machine.

The feeding mechanism F which forms no part of the present invention is mounted on the standard 2 and is driven by the indexing shaft 17 through bevel gears 25 and 25′ so as to position cherries, stem end up, in the cups 24 while the same are at rest adjacent and in alignment with the feeding mechanism F during the intermittent operation of the turret T.

The stemming mechanism S is supported on a bracket 26 extending radially from the standard 2. This bracket is provided with a horizontal bearing 27 for supporting the outer end of the stemmer drive shaft 16 hereinbefore mentioned. Mounted on the bracket 26 by bolts 28 is a fixed goose neck shaped stemmer frame 29, the head portion of which overhangs in the direction of the turret T to support the various elements of the stemming mechanism S above the turret. This stemmer frame 29 (Fig. 4) has a pair of vertically aligned bearings 30 and 31 formed integrally thereon, the bearing 30 being formed in the head portion of the frame 29 and the bearing 31 being formed on an integral web 32 of the stemmer frame 29 substantially midway between the head portion thereof and the stemmer drive shaft 16. A pair of telescopically interfitting reciprocable shafts 33 and 34 are arranged for vertical movement in the aligned bearings 30 and 31. The outer shaft 33 is a sleeve shaft which embraces the inner shaft 34 and is guided by the aligned bearings 30 and 31. The inner shaft 34 in turn is guided by the sleeve shaft 33 so that both shafts 33 and 34 may be reciprocated relative to the frame 29 as well as relative to each other.

The shafts 33 and 34, (Figs. 4 and 5) are reciprocated by an actuating mechanism which includes a rotary cam 35 keyed to the stemmer drive shaft 16 closely adjacent the horizontal bearing 27 in the bracket 26. The rotary cam 35 has a hub portion 36 extending therefrom toward the center of the turret T to lengthen the keying surface of the cam 35 relative to the shaft 16 and to provide a mounting for a thrust block 37.

The lower end of the outer reciprocable shaft 33 extends into the shank portion of a bifurcated arm 38 and is flared outwardly to prevent its withdrawal from the shank of the arm 38. A pair of depending prongs 39 of this bifurcated arm 38 straddle the stemmer drive shaft 16 and the thrust block 37 to prevent lateral movement of the bifurcated arm 38 and to guide the outer shaft 33 for reciprocable movement in the aligned bosses 30 and 31. Secured to the bifurcated arm 38 at the point of convergence of its prongs 39 is a pin 40 which extends into the lower end of the outer shaft 33 to further secure the bifurcated arm 38 thereto. Rotatably mounted on the pin 40 is a cam roller 41 which extends into an outer peripheral cam track 42 formed in the rotary cam 35 to impart reciprocable movement to the outer shaft 33.

The lower end of the inner reciprocable shaft 34 extends beyond the lowermost end of the shaft 33 into the space between the prongs 39 of the bifurcated arm 38 above the drive shaft 16 and the thrust block 37. Secured to the lower end of the inner reciprocable shaft 34 is a movable guide block 43 which engages inner guide faces 44 of the prongs 39 to guide the lower end of the inner shaft 34 during reciprocation thereof. Mounted on the movable guide block 43 is a pin 45 a reduced portion 45a of which extends through the lower end of the shaft 34 to secure the latter to the movable block 43. A roller 46 is mounted on the free end of the pin 44 and extends into an inner peripheral cam track 47 formed in the rotary cam 35. This cam track 47 is adapted to reciprocate the inner shaft 34 with the outer shaft 33 and relative to the latter. The prongs 39 of the bifurcated arm 38 are provided with a cover plate 48 and are guided between one side of the rotary cam 35 and a collar 49 fastened to the stemmer drive shaft 16 by a set screw 50 so that lateral movement of the prongs 39 relative to the shaft 16 is prevented. The bottom ends of the depending prongs 39 are joined by a plate 51 to further close the guideway provided between the prongs 39.

A stemmer head assembly generally indicated at 52 is carried by the reciprocable shafts 33 and 34 for movement therewith. This stemmer head assembly (Fig. 4) comprises a movable stemmer bracket 53 including vertically spaced bearing bosses 54 and 55 having aligned bores formed therethrough for slidably arranging the bracket 53 on the outer reciprocable shaft 33. These bosses 54 and 55 are joined by a cylindrical shaped web 56 (Figs. 4 and 7) disposed concentric with respect to the vertical axis of the aligned bearing bosses 54 and 55. The web 56 as shown in Figs. 3, 8, and 11, has a pair of tangentially extending parallel arms 57 forming horizontally spaced supports above the fruit supporting cups 24 of the turret T disposed thereunder. These parallel arms 57 are joined at the upper edge of their extremities by an integral web 58 (Fig. 4) and have two sets of aligned bearings 59 and 60 (Figs. 14 and 5) spaced from each other to either side of the web 58 for supporting a pair of stemmer jaws 62.

The stemmer jaws 62 comprise an outer stemmer jaw 63 and an inner stemmer jaw 66 which are movable toward and away from each other. The outer stemmer jaw 63 is formed integrally with a drive yoke 64 pivotally mounted on an outer jaw shaft 65 extending through the bearings 59 on the parallel arms 57 to rockably support the drive yoke 64 and outer jaw 63 on the bracket 53. The inner stemmer jaw 66 is pivotally mounted on an inner jaw shaft 67 extending through the bearings 60 on the parallel arms 57 of the movable stemmer bracket 53 to rockably support the inner jaw 66 thereon.

The two jaws 63 and 66 are linked together for simultaneous movement toward and away from each other by a jaw swivel block 69 secured to a pin 68 which is supported between and equally spaced from the two jaw shafts 65 and 67 by bearings 64', Fig. 10, formed in the drive yoke 64. The inner jaw 66 has a yoke formation 70 extending radially therefrom embracing the jaw swivel block 69 in such a manner that upon rotative movement of the outer jaw 63 on its shaft 65 in one direction the block 69 will slide in the yoke 70 to impart a like rotative movement to the inner jaw 66 in an opposite direction.

Each of the jaws 63 and 66 (Figs. 4 and 8) has a stem engaging face 71 at its lower extremity. The faces 71 are preferably formed of an abrasive material imbedded in a stem gripper block 72, each of the jaws 63 and 66 having one of such blocks suitably secured in a recess 73 formed in their lower extremities.

The jaws 63 and 66 are swung relative to each other on their respective shafts 65 and 67 by a jaw actuating mechanism comprising a jaw operating yoke 74 (Fig. 4) which embraces a drive block 75 secured to a pin 76 (Fig. 14) supported at its ends for swivel movement in aligned bores 76' formed in the outermost horizontal section of the drive yoke 64 in such a manner that the block 75 is slidably arranged in the yoke 74. The jaw operating yoke 74 has a vertical sleeve portion 77 slidably arranged on the outer reciprocable shaft 33 between the spaced bosses 54, 55 of the stemmer bracket 53 for movement relative to the shaft 33 and to support the yoke 74 horizontally for operative connection with the drive block 75. The sleeve portion 77 has a reduced threaded neck 78 on its upper end upon which an adjustable shoulder ring 79 surrounding the shaft 33 is threaded. The ring 79 forms a seat for a compression spring 80 likewise surrounding the shaft 33 and compressed toward the ring 79 by a collar 81 fixed to the outer shaft 33 by a pair of set screws 82 (Fig. 6). The sleeve portion 77 also has a pair of set screws 83 having inner ends 83a extending therefrom into vertical slots 84 formed in the outer shaft 33 to prevent rotation of the yoke 74 about the shaft 33 but permitting limited vertical movement of yoke 74 relative to shaft 33.

It will be noted from Figs. 3 and 5 that the jaws 62 extend beyond the lateral side faces of the parallel arms 57 and that the outer stemmer jaw 63 (Fig. 14) has outer bearings 85 pivotally arranged on the outer jaw shaft 65. A U-shaped frame 86 is carried by the outer jaw shaft 65 and comprises a pair of parallel lever arms 87 joined at their bottom by a horizontal plate 88 bolted as at 88' to the arms 87. Each lever arm 87 has a bearing 89 adjacent its upper end for pivotally mounting the U-shaped frame 86 on the outer ends of the outer jaw shaft 65 to permit rotative movement of the U-shaped frame 86 on the shaft 65 with the outer stemmer jaw 63 as well as relative thereto (Fig. 17).

Extending upwardly from each of the bearings 89 is a lever 90 formed integrally with the parallel levers 87 and to each of these levers 90 is hooked one end of a tension spring 91 while the opposite end of each tension spring 91 is anchored to the frame 29. The arrangement is such that the U-shaped frame 86 is normally urged counter-clockwise as seen in Figs. 1, 8, 10, 13 and 16 to cause a lug 92 formed on the lower extremities of the parallel lever arms 87 to bear against lateral projections 93 formed integrally on the outer stemmer jaw 63 (Fig. 5). The counter-clockwise movement of the U-shaped frame 86 is thus imparted to the outer jaw 63 and by its link with the inner jaw 66 through the yoke 70 and swivel block 69 the inner jaw 66 is simultaneously urged in an opposite or clockwise direction (Figs. 1, 8, 10, 13 and 16) thereby tending to close the jaws 62 for gripping the stems extending upwardly from the fruit supported in the cups 24 on the turret T.

The gripping engagement between the faces 71 of the two stemmer jaws 63 and 66 is tightened as seen in Figs. 4 and 6 by the compression spring 80, the degree of compression thereof varying as the distance between the collar 81 varies relative to the shoulder ring 79. The ring 79 may be adjusted with respect to the threaded neck 78 of jaw operating yoke 74 to obtain the desired gripping pressure between the faces 71.

It will be noted from Figs. 4 and 6 that the upward movement of the reciprocable shafts 33 and 34 effects an elevation of the whole stemmer head assembly 52 by reason of a connection of the lower bearing boss 55 of the stemmer bracket 53 with the inner reciprocable shaft 34. This connection is established by a pin 96 (Fig. 4) extending through the inner reciprocable shaft 34 and diametrically opposed vertical slots 97 formed in the outer reciprocable shaft 33 to permit relative movement of the shafts 33 and 34 and to permit the pin 96 to extend through the lower bearing boss 55 of the stemmer bracket 53. This pin 96 has threaded ends upon which suitable nuts 98 (Fig. 6) are threaded to secure the pin 96 on the boss 55 and the inner shaft 34 for movement therewith.

The stemmer jaws 62 are opened by upward movement of the outer reciprocable shaft 33 relative to the inner reciprocable shaft 34 during the rotation of the rotary cam 35. As seen in Figs. 4 and 6 the initial upward movement of the outer shaft 33 relative to the inner shaft 34 releases the compression of the spring 80 whereby the clamping force of the stemmer jaws 62 is reduced. However, the jaws 62 remain in closed condition under the normal tension of the spring 91. At this moment the lower bight portions 84a of the slots 84 formed in the outer shaft 33 engage the inner ends 83a of the set screws 83 carried by the jaw operating yoke 74, 77 so that the yoke 74 will raise with the outer shaft 33 as it continues to move upwardly. This upward movement of the jaw operating yoke 74 in turn raises the drive block 75 relative to the stemmer bracket 53 to rotate the drive yoke 64 and outer jaw 63 counter-clockwise (Fig. 4) about the outer jaw shaft 65 against the normal action of the tension spring 91. A counter-clockwise movement is correspondingly imparted to the jaw swivel block 69 which through yoke formation 70 on the inner stemmer jaw 66 rotates the latter clockwise (Fig. 4) about the inner jaw shaft 67 thereby opening the jaws 62 as seen in Fig. 16.

As shown in Figs. 4 and 7 the entire head assembly 52 is keyed against rotative movement relative to the reciprocable shaft 33 but is permitted to reciprocate vertically relative thereto.

For this purpose I provide a two-way adjustable key between the head assembly 52 and the stemmer frame 29 as will now be explained. The stemmer bracket 52 although vertically movable, is held against rotation about the vertical outer shaft 33 by horizontally adjustable keys 99 and 100 (Figs. 4 and 7) disposed in a vertical keyway 101 formed in the cylindrical web 56 of the bracket 53. The uppermost key 99 is secured by a bolt 102 to a horizontal shaft 103 and the lower key 100 is secured to a like shaft 104 by a bolt 105. The two ends of each of these key shafts 103 and 104 extend through aligned bores in side skirting 106 of the stemmer frame 29 and are threaded to receive nuts 107. The nuts 107 are tightened in such a manner that the upper key 99 is urged to the left as indicated by arrow 99a in Fig. 7, while the lower key 100 is urged to the right, as indicated by arrow 100a in Fig. 7. By this arrangement the keyway 101 although worn by constant reciprocation of the stemmer bracket 53 can be properly engaged at each side by lateral shifting of the shafts 103 and 104 and keys 99 and 100, respectively, thereby maintaining the parallel arms 57 in correct alignment relative to the turret T.

In the following, the major positions assumed by the stemmer head assembly 52 during the rotation of the rotary cam 35 are explained in conjunction with radial lines marked on the cam 35 and designated A, B, C and D in Fig. 5. When during the rotation of the cam 35, the radial line A thereof registers with the cam rollers 41 and 46 these rollers are at their extreme spacing relative to each other and the outer shaft 33 is at its extreme reciprocable limit upward relative to the inner shaft 34. In this position the stemmer jaws 62 are open as seen in Fig. 8 and the stemmer head assembly 52 is slightly elevated. As the cam 35 rotates in the direction of the arrow 35a of Fig. 5, i. e. clockwise, the outer cam track 42 declines rapidly while the inner cam track 47 declines less rapidly until the radial line B is in registration with the cam rollers 41 and 46 as shown in Figs. 4 and 5. During this part of the rotation of the cam 35 both shafts 33 and 34 are moved to their lowermost position and the shaft 33 moves to its lowermost position relative to the shaft 34 whereby the stemmer head assembly 52 is lowered and the stemmer jaws 62 are closed as shown in Fig. 10. During the next phase of rotation of the cam 35 until the radial line C registers with the cam rollers 41 and 46 these rollers do not move relative to each other but are elevated in unison. The united elevation of the rollers 41 and 46 raises the entire head assembly 52 beyond the full line illustration of Fig. 13. As the cam 35 continues its clockwise rotation and while line D thereof moves into registration with the rollers 41 and 46 the inner cam track 47 maintains the roller 46 stationary at its extreme elevated level while the outer cam track 42 further elevates the roller 41. Consequently shaft 34 remains stationary while shaft 33 is elevated whereby the compression on the jaw tightening spring 80 is released and the stemmer jaws 62 are swung to open position as shown in Fig. 16. During the remainder of the rotation of the cam 35 from line D to line A the various parts of the stemmer are returned to their initial position completing one cycle of operation.

The stem centering mechanism of the present invention (Figs. 9, 11, 12 and 15) comprises a pair of comb units 108 and 109. The comb unit 108 comprises a plurality of normally spaced fingers arranged in pairs consisting of companion fingers 110 and 111 having their ends flared to provide V slots 112 facing the space between the stemmer jaws 62. This comb unit 108 is carried by the horizontal plate 88 forming the bight portion of the U-shaped frame 86 mounted on the outer jaw shaft 65 along with the outer stemmer jaw 63 for movement therewith and relative thereto.

The other comb unit 109 (Figs. 8 and 9) forming a part of a stripping mechanism 109a carried by the inner stemmer jaw 66 comprises a plurality of stripping feet 113 commensurate in number to the number of fruit holding cups 24 of a cordal group on the turret T. Each stem stripping foot 113 is V-shaped at its end facing the opposite stemmer jaw 63 and is downwardly off-set relative to the opposite fingers 110 and 111 of the comb unit 108 to underlie the latter when the jaws are in closed position as seen in Figs. 4 and 10. The comb units 108 and 109 cooperate to righten the stems of the fruit i. e. to dispose the stems in a vertical position as the stem gripping jaws 63 and 66 approach each other as illustrated in Figs. 8 to 11 thus assuring that each fruit will be properly positioned in its respective cup 24 with the stem blossom axis of the fruit in alignment with the vertical axis of the cup. Each foot 113 (Figs. 4, 5, 8, 10 and 11) has a mounting portion 114 secured by nuts 115 and 115a to the lower end of a stripping shaft 116. Each shaft 116 is reciprocably mounted in spaced bearings 117 formed integrally on the back face of the inner stemmer jaw 66. Each stripping shaft 116 has a longitudinal key 118 which rides in a keyway formed in spaced bearings 117 to prevent rotative movement of the shaft 116 and to maintain the foot portion 113 thereof in alignment with respect to the fruit holding cup 24 cooperating therewith.

The reciprocable movement of the stripping shafts 116 is controlled by a stripper yoke unit 119 having two parallel yokes 120. The yoke unit 119 is pivotally mounted on the overhanging head portion of the stemmer frame 29 by separate pintles 121 secured to the yoke unit by set-screws 122 and extending through axially aligned bearings 123 formed in the side skirting 106 of the frame 29. The yoke unit 119 includes a transverse web 124 to which a stripper cam 126 having an acclivity 127 is secured by bolts 125. The stripper cam 126 engages a cam roller 128 carried by a shaft 129 extending into bearings 130 formed in upwardly extending portions of the drive yoke 64. The stripper yoke unit 119 is normally held in such position by a tension spring 131 (Fig. 8) that the stripper cam 126 of the yoke unit engages the roller 128. The spring 131 is anchored to the stemmer frame 29, and the other end of the spring is hooked to the free end of a lever 132 secured to the end of one of the pintles 121 supporting the yoke unit 119 on the frame 29.

It will therefore be seen that during the rotation of the cam 35 from position B to C (Fig. 4) causing elevation of the assembly 52 while jaws 62 are in gripping engagement with the stems of the fruit, the cam roller 128 engages the acclivity 127 effecting rotation of the stripper yoke unit 119 relative to the frame 29 against the action of the tension spring 131. It is also apparent that when the stemmer drive yoke 64 is rotated counter-clockwise (Fig. 4) about its shaft 65 to open the jaws 62 the cam roller 128 will swing away from stripper cam 126 to free the latter for rotative movement under the action of tension spring 131. This rotative movement of the yoke unit 119 is subsequently checked by engagement of a transverse web 133 thereof with a stop lug 134 secured to the overhanging head portion of the stemmer frame 29.

The yoke arms 120 embrace split block 135 and 135a (Figs. 5 and 16) within which cylindrical shank portions 136 and 136a of a stripping shaft spacing bar 137 are rotatably mounted. The bar 137 is provided with a plurality of spaced passages 137a within which the upper portions of the stripping shafts 116 are slidably mounted. Each shaft 116 is provided with a helical spring 138 disposed below the bar 137. The springs 138 are held under desired compression against the underside of the bar by an adjustable collar 139 fixed by set screws 139' to the shafts 116. Similar helical springs 140 on each shaft 116 are disposed above the bar 137 and are held under desired compression against the upper side of the bar by an adjustable collar 141 fixed by set screws 141' to the upper ends of the shafts.

Each stripping foot portion 113 is positioned relative to the stemmer jaw 66 in such a manner that the nut 115a abuts against the bearing 117 adjacent the same when the jaws are in the position as shown in Fig. 8. Upon closing of the jaws 63 and 66 each stripping foot is slightly lowered so as to move beneath the fingers 110 and 111 on the opposite stemmer jaw 63 and to cooperate with said fingers so as to center the stems relative to the vertical axis of the fruit holding cup 24. When the stemmer jaws 63 and 66 are tightened to grip the stem of the fruit as hereinbefore explained and the stemmer head assembly 52 is elevated by rotation of the cam 35 from position B to position C (Fig. 5) the fruit is lifted from the supporting cup 24 so that it is pendently supported by its stem.

During the initial upward movement of the stemmer head assembly 52 each stripping foot 113 is depressed by reason of the engagement of the cam roller 128 on the drive yoke 64 with the stripper cam 126 whereby the yoke unit 119 is rocked against the action of spring 131 and the spacer bar 137 is urged downwardly. The downward movement of the spacer bar 137 compresses the lower helical springs 138 whereby the collars 139 and stripping shafts 116 are urged downwardly.

As each stripping foot 113 is depressed it engages the stem end of the suspended fruit to center the fruit in an inverted dish portion 142 (Fig. 11) formed on the underside of each stripping foot 113 and concentric with the apex of the V-shaped end thereof. During this lowering of each stripping foot 113 relative to the stemmer jaws 62 the stem of each fruit is taughtened whereby the fruit is oriented and centered within the inverted dish portions 142 and subsequently severed from the stems and positively pushed downwardly in oriented condition into the cups 24.

This replacement of each fruit in oriented position back into its cup 24 is brought about by a snap like downward movement of each stripping foot 113 as the fruit is stripped from the stem under the increased compression of the respective helical spring 138. The downward movement of each foot 113 is faster than the gravitational movement of the fruit so that the fruit at no time is out of the control of the stripping feet 113 and is maintained in oriented position during its deposit into the cups 24.

The helical springs 138 also function to yieldingly press the stripping feet 113 downwardly upon the cherries while the latter are seated in the fruit holding cups 24. Since the cherries vary in size and shape some cherries will extend higher out of the cup 24 than others. However, although each foot 113 is depressed to a certain level to assure engagement with the smallest cherry in the cup therebeneath each foot is free to yield upwardly against the action of spring 138 upon engagement with the stem end of the cherry so that each foot 113 assumes a level commensurate with the upper surface of the fruit seated in the cup 24 without crushing or distorting the fruit.

Each cherry is therefore positively replaced into its cup 24 in oriented condition i. e. stem end up and with its stem blossom axis in alignment with the axis of the cup so that subsequent operations such as pitting and reshaping may be effectively performed on the fruit and a uniform product is obtained.

After the fruit has been stripped from its stem the head assembly 52 continues to rise to the dotted line position shown in Fig. 13 thus elevating cam roller 128 beyond the stripper cam acclivity 127 whereby the yoke unit 119 is released for rotation into normal position by its spring 131, and the stemmer jaws 62 are raised relative to the spacing bar 137 causing the stripping feet 113 to remain in depressed position relative to the outer jaw 66 but elevated above the oriented fruit.

Associated with the comb unit 108 cooperating with the outer stemmer jaw 63 is an actuating mechanism for operating the spaced fingers 110 and 111 so as to clamp or grip the stems of the cherries subsequent to the stripping operation and to release the same after the jaws 62 have been swung to open position.

The comb unit 108, as hereinbefore explained, is carried by the horizontal plate 88 forming the bight portion of the U-shaped frame 86 which operates jointly with the outer stemmer jaw 63. The fingers 110 are equally spaced from each other and are secured to the upper side of the horizontal plate 88 by spot welding (Fig. 12). The fingers 111 are spot welded to the underside of a shiftable plate 143 which is arranged between the lever arms 87 of the U-shaped frame 86 with each finger 111 arranged in the space between companion fingers 110 so that the fingers 111 may shift laterally as a unit relative to the fingers 110.

Secured by countersunk bolts 144 at each end of the shiftable plate 143 is a mounting block 145 having aligned bores 146 for mounting the blocks 145 on a shiftable shaft 147 to which the blocks are secured by set screws 148 (Fig. 9). The ends of this shiftable shaft 147 extend through bores 149 in the lever arms 87 whereby the shaft 147 is slidably arranged within the U-shaped frame 86 with the fingers 111 in the same horizontal plane as the fingers 110 for shiftable movement relative thereto.

The shaft 147 and the shiftable section of the comb unit 108 i. e. the plate 143 and fingers 111 are normally urged in one direction relative to the stationary section of the comb unit by a compression spring 150 arranged on a protruding end 151 of the shaft 147 and held in compressed relation with the side wall of the adjacent lever arm 87 by a collar 152 fixed to the shaft 147 by a set screw 153. By this arrangement the fingers 111 of the laterally shiftable section of the comb unit 108 are normally held in spaced relation with respect to the fingers 110 of the stationary section of the comb unit and with one of the mounting blocks 145 bearing against the side wall of the adjacent lever arm 87 (Fig. 14). With the fingers 110 and 111 in spaced relation the comb unit 108 forms a stem centering foot cooperating with the stripping feet 113 on the inner stemmer jaw 66 to vertically align the stem of the fruit before the stemmer jaws 62 grip the stems and elevate the latter for orienting and stripping operations hereinbefore explained.

The shaft 147 is shifted against the action of the compression spring 150 (Fig. 14) by a lever 154 extending laterally in the general direction of the longitudinal axis of the shifting shaft 147 and having one end threadably secured to a yoke lever 155 straddling the shaft 147 and having its upper end pivotally mounted as at 156 on an inwardly extending bracket 157 on one of the lever arms 87.

The shaft 147 is hollow at the end straddled by the yoke lever 155 to provide a housing 158 (Fig. 9) for receiving a cushion spring 159 which bears against a pin 160 carried by the yoke lever 155 and extending through aligned slots 161 formed in the shaft 147. The open end of the tubular housing 158 in the shaft 147 is closed by a screw plug 162 threaded into the tubular housing to hold the cushion spring 159 under desired pressure against the pin 160 and to maintain the latter at one end of the slots 161 as seen in Fig. 9.

The free end of the lever 154 is adapted to be engaged by a cam bracket 163 fixed by bolts 164 to the stemmer frame 29. When the head assembly 52 is elevated the free end of the lever 154 is depressed by the cam bracket 163. Therepressed whereby the yoke 155 is swung clockwise (Fig. 14) and the pin 160 is forced against the cushion spring 159 thereby shifting the shaft 147, mounting blocks 145 and plate 143 to move the fingers 111 toward the fingers 110 thus closing the fingers relative to each other.

The cushion spring 159 provides a yieldable connection between the clamping fingers 110 and 111 and the yoke pin 160 so that when the stems are clamped, additional movement of the pin 160 by reason of further depression of the lever 154 merely compresses the cushion spring 159.

When during the rotation of the cam 35 the radial line C thereof (Fig. 5) approaches the rollers 41 and 46 the laterally shiftable section of the comb 108 is shifted so that the fingers 111 thereof move toward the fingers 110 of the stationary section of the comb 108 whereby the severed stems held by the stemmer jaws 62 are clamped between the fingers 110 and 111. Therefore when the jaws 63—66 are subsequently opened the severed stems are firmly held by the comb unit 108 associated with the outer stemmer jaw 63. In other words the shiftable section of the comb 108 is shifted toward the stationary section thereof as the stemmer head assembly is raised from the full to dotted line position in Fig. 13 and the free end of the lever 154 is depressed by the cam bracket 163. Thereupon the continued rotation of the rotary cam 35 from registration of the cam rollers 41 and 46 with the radial line C to their registration with the radial line D (Fig. 5) causes the roller 41 to continue upwardly while the roller 46 remains at its extreme elevated level in the dwell of the cam track 47 thus raising the outer reciprocable shaft 33 and the jaw operating yoke 74 and rocking the stemmer drive yoke 64 as hereinbefore explained whereby the stemmer jaws 62 are opened as shown in Fig. 16 while the severed stems are firmly held between the fingers 110 and 111 associated with the outer stemmer jaw 63.

A shoe 165 is fixed to the underside of the plate 88 below one of the lever arms 87 of the U-shaped frame 86 by means of the bolts 88'. This shoe 165 has a downwardly bent end 166 extending outwardly toward the stemmer frame 29 and is provided with a lateral cam portion 167 adapted to engage a dog 168 secured to the inner face of the web 32 of the frame 29. The arrangement is such that when the stemmer head assembly 52 is in fully elevated position as seen in Fig. 16 the downwardly bent cam portion 167 of the shoe 165 swings into a position above the laterally extending dog 168 when the jaws 62 are opened. Upon descent of the stemmer head assembly 52 the bent cam portion 167 engages the dog 168 and is cammed outwardly and away from the outer stemmer jaw 63. This camming action of the bent cam portion 167 likewise causes the U-shaped frame 86 to be swung away from the outer stemmer jaw 63 thus swinging the comb unit 108 under the gripping face 71 of the outer jaw 63 to pull the severed stems which are still clamped between the fingers 110 and 111 back under the jaw 63.

When the clamping jaws 62 are open as seen in Fig. 16 it will be noted that the lever 154 has swung into a recessed portion 169 of the cam bracket 163. Therefore as the stemmer head assembly descends the lever 154 is released permitting compression spring 150 to urge the shiftable shaft 147 and the shiftable section of the comb unit 108 to normal position whereby the fingers 111 are shifted away from the fingers 110 and the severed stems are released and drop at a point remote from the fruit holding cups 24 outside the periphery of the turret T. If desired a suitable discharge chute, not shown, may be provided for conveying the severed stems away from the fruit handling mechanism.

Upon continued descent of the stemmer head assembly 52 the cam portion 167 rides off of the dog 168, and the U-shaped frame 86 is returned into engagement with the outer stemmer jaw 63 under the action of the springs 91. The rotary cam 35 has now completed one cycle of operation and the radial line A thereof is again in registration with the cam rollers 41 and 46 to permit the stemmer head assembly 52 to assume the position shown in Fig. 8 and is ready for operation upon the next group of cherries.

Briefly summarizing the operation of the foregoing structure, it will be recalled that one chordal group of cups 24 first receives a series or a group of fruit from the feed mechanism F with the stems of the fruit extending substantially in an upward direction. The turret T is then intermittently operated to thereby present one chordal group of fruit supporting cups 24 to the stemming mechanism S. When the chordal group of cups is thus presented to the stemming mechanism, the radial line A of the cam 35 is in registration with the cam rollers 41 and 46 whereby the stemmer jaws 62 are held in open condition. During movement of the cam 35 in a clockwise direction, Fig. 5, so as to register its radial line B with the cam rollers 41 and 46, the stemmer head assembly 52 is lowered into the position as shown in Fig. 4, and simultaneously therewith the stem gripping jaws 62 approach closed position. It will be apparent from Fig. 9 that during closing of the jaws 62, the stem centering combs 108 and 109, carried by the respective jaws 63 and 66, engage the stems of the fruit supported by the cups 24 to righten the stems until they are disposed in substantially vertical position. Consequently, when the stem gripping faces 71 on the jaws 62 engage the stems, as illustrated in Fig. 10, the stems are gripped and held in a substantially vertical position, the faces 71 of the gripping jaws tightening upon the stems as the spring 80 is compressed, in the manner as shown in Fig. 4.

During the next phase of rotation of the cam 35 until the radial line C registers with the cam rollers 41, 46, the stemmer bracket 53 is elevated with the stems firmly gripped between the jaws 62 thereby lifting the cherries by their stems until the cherries are pendently supported above the cups 24. As the stemmer bracket 53 rises the yoke unit 119 associated therewith is rocked downwardly causing downward movement of the stem stripping shafts 116. Consequently, each stripping foot 113, of the comb unit 109 associated with the shafts 116, engages the stem end of the pendently supported cherries. As the downward pressure of the stripping feet 113 increases relative to the upward movement of the stemmer bracket, the suspended cherries are centered in the dish portions 142 of each foot, the stems of the fruit are tautened, orienting the fruit relative to the cups 24 followed by a quick severance of each cherry from its stem. The fruit portion is then positively pushed downwardly by the stripping feet 113 into the cups 24 therebelow. It is, therefore, apparent that the stemming mechanism of the present invention is so constructed that the upward movement of the stemmer bracket 53 causes a simultaneous downward movement of the stem stripping feet 113, forming a portion of the stem centering mechanism, to strip the fruit from their stems, orient the fruit, and positively deposit the fruit into their respective supporting cups 24 in a proper position for further treatment.

As the stemmer bracket 53 continues to move upwardly, as aforesaid, the lever arm 154 engages the cam bracket 163, see dotted lines Fig. 13, rocking the lever arm 154 to actuate the stem clamping fingers 110, 111, which constitute the comb unit 108, from normal stem aligning position, as shown in Figs. 11 and 12, to stem clamping position, as shown in Fig. 14. The stems are therefore clampingly held by the fingers 110—111 as well as by the faces 71 of the jaws 62 as the stemmer bracket rises to its maximum elevated position. It should be noted that the cushion spring 159 within the clamp actuating mechanism yields sufficiently during clamping of the stems to avoid crushing of the stems to thereby prevent fragments of the stems from clinging to the stem engaging edges of the clamping fingers 110, 111. This eliminates the danger of stem fragments subsequently falling onto and fouling the turret or the fruit cups 24 while the fruit is pendently supported thereabove.

During the next phase of the rotation of the cam 35, i. e., toward registration of the radial line D with the cam rollers 41, 46, the jaws 62 open while the stemmer bracket 53 remains in fully elevated position, as seen in Fig. 16. It is while the stemmer jaws 62 are held in opened condition, as aforesaid, that the turret T is again intermittently operated to move the stemmed cherries from beneath the stemming mechanism S and to present a new group of unstemmed fruit to the same.

During opening of the stemmer jaws 62, the lever arm 154 slips into the recess portion 169 of the cam bracket 163 and, although the clamp actuating mechanism is thereby slightly released, there is yet sufficient compression on the cushion spring 159 to hold the clamping feet 110, 111 in closed condition against the stems therebetween. Moreover, as the jaws 62 open, the shoe 165 associated with the U shaped frame 87 on the outer stemmer jaws 63 moves into a position above the dog 168 secured to the frame 29. Consequently, as the cam 35 proceeds through the next phase of its operation toward registration of its radial line A with the cam rollers 41, 46, the stemmer bracket 53 is lowered into the position as shown in Fig. 17. The foregoing causes the U shaped frame 87 and stem clamping fingers 110, 111 to be cammed outwardly as the shoe 165 slides over and behind the dog 168, i. e., the comb unit 108 carrying the stems is moved away from the outermost stemmer jaw 63 as the lever arm 154 is released during movement thereof away from the cam bracket 163. The stems are therefore released from between the clamping fingers 110, 111 at a point remote from the turret T, as is illustrated in Fig. 17. The stemmer head assembly then progresses to the position shown in Fig. 8 and the shoe 165 passes beyond engagement with the dog 168 permitting the U shaped frame and now opened comb unit 108 to return to normal position below the outer stemmer jaws 63. The foregoing cycle of operation is then repeated upon each intermittent operation of the turret T to automatically strip the fruit from the stems, deposit the fruit in oriented position in the cup 24, and to discharge the stems beyond the periphery of the turret T.

While I have described a particular embodiment of the present invention it will be understood that various changes and modifications may be made without departing from the spirit of the present invention and the scope of the appended claims.

Having thus described my invention and in what manner the same may be used, what I claim as new and desire to protect by Letters Patent is:

1. A stemming device for fruit pitting machines comprising pivotally arranged gripping jaws, stem centering means mounted adjacent each of said jaws beneath the same and movable therewith for righting the stems incident to closing of the jaws, means for closing said jaws, means for movably mounting the stem centering means adjacent one of said jaws for relative movement in a plane normal to the plane of the closing action of said jaws, and means for effecting coordinated movement of said relatively movable stem centering means relative to the jaws.

2. A stemming mechanism for fruit pitting machines comprising cooperating stem gripping jaws, means for closing the stem gripping jaws for gripping the stem of a fruit presented thereto, stem centering means mounted adjacent and movable with the stem gripping jaws for aligning the stem of the fruit with respect to the stem gripping jaws during closing of the same, means for mounting the stem centering means on one of the stem gripping jaws for movement lengthwise of an aligned stem gripped by said jaws, and means for moving the movable stem centering means toward the fruit in coordinated relation with the stem gripping jaws while the stems are held thereby for engaging the fruit and for stripping the same from the stem.

3. A stemming mechanism for fruit pitting machines comprising cooperating jaws, means for closing the jaws for gripping the stem of a fruit presented thereto, centering means mounted adjacent each of said jaws and simultaneously operable therewith for aligning the stem of the fruit with respect to the jaws during closing of the same, a portion of said stem centering means being mounted for coordinated movement relative to its associated jaw and in a direction lengthwise of an aligned stem gripped thereby, and means for actuating said relatively movable portion of the stem centering means for engaging the fruit and for stripping the same from the stem held by said jaws.

4. A stemming mechanism for fruit pitting machines comprising cooperating jaws for gripping the fruit by its stem, fruit supporting means for presenting a fruit to the gripping jaws, means for operating the stem gripping jaws for gripping the stem of the fruit presented thereto, means mounted adjacent each of the stem gripping jaws and cooperable for aligning the stem of the fruit with respect to the fruit supporting means incident to the operation of the stem gripping jaws to grip the stem of the fruit, means for mounting said stem aligning means associated with one of the jaws for coordinated movement relative thereto in a direction lengthwise of an aligned stem gripped by said jaws, and means for actuating said relatively movable stem aligning means for moving the latter toward the fruit for engaging the fruit to orient the same relative to the fruit supporting means and for stripping the fruit from its stem.

5. A stemming mechanism for fruit pitting machines comprising stem gripping jaws, a fruit support, means for closing the stem gripping jaws for gripping the stem of a fruit presented thereto by the fruit support, stem engaging means associated with the stem gripping jaws for aligning the stem of the fruit with respect thereto during closing thereof, means for lifting the stem gripping jaws relative to the fruit support for suspending the fruit thereabove, means mounting the stem engaging means associated with one of the jaws for vertical movement relative to the stem gripping jaws, and means for actuating said movably mounted stem engaging means incident to lifting of the stem gripping jaws for engaging the stem end of the suspended fruit to orient the fruit relative to the fruit support, for stripping the fruit from its stem and for depositing the fruit in oriented condition into the fruit support.

6. A fruit stemming machine comprising a fruit support, cooperating jaws, means for actuating said jaws for gripping the stem of a fruit presented thereto by the fruit support, stem centering means associated with each of the jaws for aligning the stem of the fruit co-axially with the fruit support incident to the gripping of the stem by said jaws, means mounting the stem centering means for vertical movement relative to the jaws associated therewith, means for raising the jaws with respect to the fruit support for lifting the fruit therefrom by its stem, means cooperating with said jaw raising means for depressing said vertically movable stem centering means to strip the fruit from its stem and return the fruit into the fruit support.

7. A fruit stemming machine comprising a fruit support, cooperating jaws, means for actuating the jaws for gripping the stem of a fruit presented thereto by the fruit support, stem centering means associated with each of the jaws for aligning the stem of the fruit coaxially with said fruit support, means on one of said jaws for guiding the stem centering means associated therewith for vertical movement, and means for lifting said jaws and for depressing the vertically movable stem centering means for stripping the fruit from its stem and for positioning the fruit stem end up in said fruit support.

8. In a fruit stemming mechanism including a pair of stem gripping jaws adapted to grip the stem of the fruit and support the fruit in suspended condition, the combination of: means on said jaws beneath the same for aligning the stem of the fruit relative to the gripping jaws incident to the gripping of the stem, means mounting the stem aligning means on one of said jaws for downward movement relative to the jaws, and means for actuating said relatively movable stem aligning means for relative downward movement with the jaws in stem gripping condition to engage the fruit and strip the same from its stem.

9. A fruit stemming mechanism comprising a pair of stem gripping jaws for gripping the stem of a fruit presented thereto, stem aligning means mounted adjacent each of said jaws and operatively connected thereto for orienting the stem of the fruit incident to the stem gripping operation of said jaws, means for mounting the stem aligning means which are adjacent one of said jaws for movement relative thereto in a direction lengthwise of a stem aligned by said aligning means, and means for moving said relatively movable stem aligning means toward the fruit in coordinated relation with a jaw gripping movement to strip the fruit from its stem gripped by said jaws.

10. In a fruit stemming mechanism including a pair of stem gripping jaws associated with a fruit support to receive and grip the stem of a fruit presented thereto by said support, the combination of: stem aligning means associated with each of the jaws to right the stem and fruit relative to said fruit support incident to the stem gripping operation of said jaws, means for mounting the stem aligning means associated with one of said jaws for vertical movement relative thereto, means for elevating the jaws to lift the fruit by its stem from the support and to hold it in suspended condition thereabove, and means operatively associated with said elevating means for actuating the movable stem aligning means to urge the later toward the stem end of the fruit whereby the fruit is oriented relative to said fruit support, stripped from its stem and replaced in oriented condition in said fruit support.

11. A stemming mechanism comprising fruit supporting means, a pair of jaws associated with the fruit supporting means for receiving the stem of a fruit supported therein, means for closing the jaws to grip the stem of the fruit and for subsequently opening the jaws to release the stem therefrom, stem engaging means on each of the jaws and cooperating to align the stem of the fruit with respect to the fruit supporting means incident to closing of the jaws, means mounting the stem engaging means on one of the jaws for reciprocable movement toward and away from said fruit supporting means, means mounting the stem engaging means on the other of said jaws for movement into clamping engagement with the stem and for lateral movement relative to the jaws, means for elevating the jaws in closed condition relative to the fruit supporting means to suspend the fruit on its stem above the fruit supporting means, means operatively associated with the elevating means for depressing the reciprocable stem engaging means to strip the fruit from the stem while the latter is gripped by said jaws, means for actuating the laterally movable stem engaging means into clamping engagement with the stem incident to opening of the jaws, and means for moving the laterally movable stem engaging means away from the jaw associated therewith and for subsequently rendering said actuating means ineffective to thereby discharge the stem from said laterally movable stem engaging means at a point remote from said fruit supporting means.

12. A stemming mechanism comprising a pair of jaws normally open to receive the stem of a fruit therebetween, means for closing the jaws to grip the stem of the fruit and for subsequently opening the jaws to release the stem therefrom, stem engaging means on each of said jaws and cooperating to align the stem of the fruit between the jaws incident to the closing of the same, means mounting the stem engaging means on one of the jaws for reciprocable movement parallel to the stem gripped thereby, means mounting the stem engaging means on the other of said jaws for movement into clamping engagement with the stem and for lateral movement away from the jaws, means for depressing the reciprocable stem engaging means to strip the fruit from its stem while the latter is gripped by said jaws, means for actuating the laterally movable stem engaging means into clamping engagement with the stem, and means for moving the laterally movable stem engaging means away from said jaws when the latter are open and for subsequently rendering said actuating means ineffective to thereby discharge the stem from said laterally movable stem engaging means at a point remote from said jaws.

13. A stemming mechanism comprising a movable fruit support, a pair of normally opened jaws arranged for reciprocable movement above said fruit support, means for closing the jaws for gripping the stem of a fruit presented thereto by the fruit support, stem engaging means associated with the jaws for aligning the stem of the fruit relative to the fruit support incident to closing of said jaws and comprising a fruit stripping foot mounted on one of the jaws for movement relative thereto to engage the stem end of the fruit and a pair of relatively movable feet mounted on the other one of the jaws for releasably holding the stem of the fruit incident to the opening of the jaws, means for elevating the jaws relative to the fruit support while the jaws are in closed position to suspend the fruit above said fruit support, means associated with the stripping foot and engageable by the elevating means for depressing said stripping foot to strip the fruit from its stem and urge the fruit into the fruit support, and means for actuating said relatively movable feet when the jaws are elevated to releasably hold the severed stem between said movable feet during opening of the jaws and to release the severed stem from said feet to thereby discharge the stem at a point remote from the fruit holding means upon subsequent lowering of the jaws.

14. In a fruit stemming mechanism including a pair of normally opened jaws adapted to receive the stem of a fruit and means for closing said jaws for gripping the stem of the fruit received thereby, the combination of: stem aligning means associated with said jaws for righting the stem of the fruit incident to the closing of said jaws and comprising a fruit stripping foot mounted on one of said jaws for vertical movement relative thereto for engaging the stem end of the fruit, and stem clamping feet mounted on the other one of said jaws for movement relative to each other for clamping the stem therebetween and for subsequently discharging the stem therefrom, means for depressing the stem stripping foot relative to the jaws to strip the fruit from its stem, means for actuating the stem clamping feet to clamp and hold the severed stem therebetween during opening of said jaws and for releasing the severed stem after the jaws assume opened condition to release the severed stem from said clamping feet.

15. A stemming mechanism comprising a fruit support, a pair of normally open jaws reciprocable in a vertical direction toward and away from said fruit support to receive the stem of a fruit supported therein, means for closing said jaws to grip the stem of a fruit presented thereto by said fruit support, stem centering means associated with said jaws for aligning the stems relative to the axis of said fruit support incident to the closing of the jaws, said stem centering means comprising a stripping foot arranged on one jaw for vertical movement relative thereto for engaging the stem end of the fruit and stem clamping feet arranged on the other jaw for holding the stem of the fruit, means for elevating said jaws while they grip the stem of a fruit, means for depressing said stripping foot during elevation of said jaws to strip the fruit from its stem and to return the fruit into said fruit support, means for actuating said stem clamping feet during elevation of said jaws to clamp and hold the stem between said clamping feet during opening of said jaws and for subsequently releasing the stem upon descent of said jaws while the latter are open to thereby discharge the severed stem at a point remote from said fruit support.

16. In a stemming mechanism including a pair of gripping jaws for gripping a fruit by its stem, the combination of: a stem discharge comprising stem clamping feet arranged on one of the gripping jaws, means mounting alternate clamping feet for shiftable movement relative to intermediate clamping feet, means normally maintaining the clamping feet in spaced relation to receive the stem of the fruit therebetween incident to closing of said jaws, means for shifting the alternate clamping feet toward the intermediate clamping feet to hold the stem therebetween incident to the opening of said jaws and for moving said feet away from each other to release the stems when said jaws are in open position.

17. In a stemming machine including vertically reciprocating gripping jaws pivotally mounted for movement into closed position when the jaws are in lowermost position for gripping the stem of a fruit presented thereto and for subsequently releasing the same when the jaws are in their uppermost position, and means for stripping the fruit from the stem while gripped by said jaws and during elevation of the same, the combination of: a stem discharge comprising a frame mounted on one of said jaws for movement therewith and relative thereto, spaced stem engaging feet arranged on said frame, means mounting alternate ones of said feet for lateral shifting movement relative to intermediate feet thereof, means normally holding said feet in spaced relation to receive the stem of the fruit incident to closing of said jaws, means for actuating said alternate feet into clamping relation with said intermediate feet for holding the stem therebetween when the jaws approach uppermost position and open relative to each other, and means for moving said frame relative to the jaw associated therewith as said jaws move toward their lowermost position, said actuating means being rendered ineffective during relative movement of said frame with respect to the jaw associated therewith to release the severed stem from said clamping feet.

18. In a stemming machine including pivotally mounted jaws alternately opening and closing to grip the stem of a fruit presented thereto and means for stripping the fruit from the stem, a stem discharge comprising in combination, stem clamping feet on one of said jaws and normally spaced to receive the stem of the fruit gripped by said jaws, means for actuating said feet to closed position for holding the stem therebetween incident to the opening of said jaws, means mounting said stem clamping feet for movement relative to said jaws, and means for moving said stem clamping feet away from said jaws and for subsequently releasing said means for actuating the feet whereby the feet assume normally spaced relation and discharge the stem therefrom at a point remote from said jaws.

19. In a stemming machine including pivotally mounted stem gripping jaws alternately opening and closing to grip the stem of a fruit presented thereto, means for lowering the jaws in open position and for raising the jaws in closed position, and means for stripping the fruit from its stem incident to raising of said jaws, a stem discharge mechanism comprising normally spaced stem clamping feet associated with one of said jaws for aligning the stem of the fruit incident to closing of the jaws, means actuated upon raising of the jaws for urging said feet into clamping engagement with respect to each other to hold a stem therebetween incident to opening of the jaws, means mounting said clamping feet on the jaw associated therewith for movement away from said jaws, means for retarding movement of said mounting means as said jaws are lowered to thereby move the clamping feet away from said jaws, said actuated means being rendered ineffective as said jaws are lowered and while said mounting means is retarded whereby said clamping feet assume normally spaced relation to release and discharge the severed stem therefrom at a point remote from said jaws.

20. In a cherry stemming apparatus including a stem support for holding a cherry by its stem while the cherry is stripped therefrom, a stem discharging mechanism comprising a frame mounted on said stem support for movement away therefrom, stem clamping feet on said frame and normally spaced to receive therebetween the stem of a cherry held by said stem support, means associated with said frame for actuating said stem clamping feet into gripping engagement with the stem therebetween while it is held by said stem support and for holding said stem after it is released from the stem support, cam means adjacent said stem support and adapted to be engaged by a portion of said frame, means for moving said stem support and said cam means relative to each other whereby said portion of said frame engages said cam to move the frame away from said stem support and said actuating means is rendered ineffective to thereby release and discharge the stem from said stem clamping feet at a point remote from said stem support.

21. In a cherry stemming apparatus including a pair of jaws alternately moving into open and closed position for receiving and holding the stem of a cherry while the cherry is stripped from its stem, a stem discharging mechanism comprising in combination a frame mounted on one of said jaws for movement laterally therefrom, stem clamping feet on said frame and normally spaced to receive the stem of a cherry held by said jaws, means on said frame and including an actuating lever for said stem clamping feet, a cam adjacent said jaws and adapted to depress said actuating lever for closing said stem clamping feet while a stem is disposed therebetween and for holding the stem after it is released from said jaws, a second cam fixed in spaced relation relative to said first named cam adjacent said jaws and adapted to be engaged by a portion of said frame when the jaws are in open position for moving the frame laterally from the jaws and means for effecting a relative reciprocable movement in a vertical direction between said jaws and said cams whereby said actuating means is depressed incident to opening of said jaws and is released incident to engagement of said portion of said frame with said second named cam thereby releasing the stem from between said stem clamping feet when they are spaced laterally from said jaws.

LEONARD AKER.

REFERENCES CITED

The following references are of record in the file of this patent:

UNITED STATES PATENTS

| Number | Name | Date |
|---|---|---|
| 1,403,946 | Hachmuth | Jan. 17, 1922 |
| 2,375,350 | Coons | May 8, 1945 |